(12) United States Patent
Hayes et al.

(10) Patent No.: US 11,767,776 B2
(45) Date of Patent: Sep. 26, 2023

(54) PROPULSION FLOW PATH DUCT SYSTEMS AND METHODS

(71) Applicant: THE BOEING COMPANY, Chicago, IL (US)

(72) Inventors: Michael Hayes, Berkeley, MO (US); Keith A. Etling, Shiloh, IL (US); Jordan Kreitzman, Saint Charles, MO (US); Rehan Kaluarachchi, Saint Louis, MO (US); Manny Urcia, Wildwood, MO (US); Andrews Guadron, Brentwood, MO (US)

(73) Assignee: THE BOEING COMPANY, Chicago, IL (US)

( * ) Notice: Subject to any disclaimer, the term of this patent is extended or adjusted under 35 U.S.C. 154(b) by 78 days.

(21) Appl. No.: 17/321,591

(22) Filed: May 17, 2021

(65) Prior Publication Data

US 2022/0074329 A1    Mar. 10, 2022

Related U.S. Application Data (60) Provisional application No. 63/074,658, filed on Sep. 4, 2020.

(51) Int. Cl.
    *G10K 11/16*      (2006.01)
    *G10K 11/172*     (2006.01)
    (Continued)

(52) U.S. Cl.
    CPC ............ *F01N 1/023* (2013.01); *B64D 27/00* (2013.01); *F02C 7/045* (2013.01); *G10K 11/161* (2013.01);
    (Continued)

(58) Field of Classification Search
    CPC ...... F02C 7/045; F02C 7/24; F05D 2260/963; F05D 2220/323; B64D 2033/0206;
    (Continued)

(56) References Cited

U.S. PATENT DOCUMENTS

| 4,989,807 A * | 2/1991 | Foreman | B64D 33/02 244/53 B |
|---|---|---|---|
| 7,540,354 B2 * | 6/2009 | Morin | F02K 1/827 428/116 |

(Continued)

FOREIGN PATENT DOCUMENTS

| EP | 3205574 | 8/2017 |
|---|---|---|
| EP | 3450738 | 3/2019 |

(Continued)

OTHER PUBLICATIONS

Extended European Search Report for EP 21194043.2-1010, dated Feb. 4, 2022.

*Primary Examiner* — Jeremy A Luks
(74) *Attorney, Agent, or Firm* — The Small Patent Law Group LLC; Joseph M. Butscher (57) ABSTRACT

A flow path duct system for a propulsion system of an aircraft includes a base defining a flow surface. The base has an internal surface and an external surface. A plurality of perforations are formed through the base between the internal surface and the external surface. A plurality of supports define a plurality of cavities. The plurality of supports extend outwardly from the external surface of the of the base. One or more of the plurality of cavities are in fluid communication with the one or more of the plurality of perforations. A backing surface is secured to the plurality of supports. The plurality of supports are disposed between the base and the backing surface. The one or more of the plurality of cavities are in fluid communication with an internal volume defined by the internal surface of the base (Continued)

through the one or more of the plurality of perforations. The base, the plurality of supports, and the backing surface can be integrally formed together as a monolithic, load-bearing structure.

21 Claims, 7 Drawing Sheets

(51) Int. Cl.
*F02C 7/045* (2006.01)
*B64D 33/02* (2006.01)
*F01N 1/02* (2006.01)
*B64D 27/00* (2006.01)
*F02C 6/20* (2006.01)

(52) U.S. Cl.
CPC .... *G10K 11/172* (2013.01); *B64D 2033/0206* (2013.01); *F02C 6/20* (2013.01); *F05D 2220/323* (2013.01); *F05D 2260/963* (2013.01)

(58) Field of Classification Search
CPC ...... B64D 33/00; B64D 33/02; G10K 11/161; G10K 11/172

USPC .................................. 181/213, 214, 215, 292
See application file for complete search history.

(56) References Cited

U.S. PATENT DOCUMENTS

| | | | |
|---|---|---|---|
| 11,059,559 B2* | 7/2021 | Cedar | E04B 1/86 |
| 2009/0114774 A1* | 5/2009 | Dyer | B64D 33/02 |
| | | | 244/53 B |
| 2015/0122905 A1* | 5/2015 | Martin | F02K 1/1223 |
| | | | 239/265.19 |
| 2015/0367953 A1* | 12/2015 | Yu | B64D 33/06 |
| | | | 181/290 |
| 2017/0167291 A1 | 6/2017 | Koroly | |
| 2017/0225764 A1* | 8/2017 | Nampy | B64C 1/066 |
| 2018/0218723 A1* | 8/2018 | Lin | B32B 3/266 |
| 2019/0063318 A1* | 2/2019 | Roach | G10K 11/168 |
| 2020/0049074 A1* | 2/2020 | Geertsema | B29D 99/0089 |

FOREIGN PATENT DOCUMENTS

| | | |
|---|---|---|
| EP | 3553771 | 10/2019 |
| EP | 3671728 | 6/2020 |
| WO | WO2014/200499 | 12/2014 |

* cited by examiner

PROPULSION FLOW PATH DUCT SYSTEMS AND METHODS

CROSS-REFERENCE TO RELATED APPLICATIONS

This application relates to and claims priority benefits from U.S. Provisional Application No. 63/074,658, entitled "Integrated Propulsion Flow Path System and Method for Reduced Noise," filed Sep. 4, 2020, which is hereby incorporated by reference in its entirety.

FIELD OF THE DISCLOSURE

Embodiments of the subject disclosure relate to acoustical damping systems and methods, such as additively manufactured, integral acoustic damping systems and methods within a propulsion flow path duct of an aircraft.

BACKGROUND OF THE DISCLOSURE

Various air vehicles include propulsion systems that generate noise. On commercial aircraft, for example, engine nacelle inlets include fan blades and other components that generate noise. To reduce the generated noise, acoustic liners have been installed in such areas to dampen the sound. For example, known liners include porous or mesh face sheets, typically made of titanium, stainless steel, or aluminum, laid over air cavities with a rigid backing. In some applications, the air cavities form a honeycomb structure to provide some rigidity to the liners. Some applications can include two air cavities, separated by a mesh material. In general, the liners act as damping and phase cancellation mechanisms for noise.

However, the known liners are typically mounted to primary structure and add complexity to the overall design.

SUMMARY OF THE DISCLOSURE

A need exists for a system and method for efficiently and effectively reducing noise in relation to various components, such as within propulsion systems of aircraft. Further, a need exists for a less complex system and method for reducing noise with respect to engine of aircraft, for example.

With those needs in mind, certain embodiments of the subject disclosure provide a flow path duct system for a propulsion system of an aircraft. The flow path duct system includes a base defining a flow surface. The base has an internal surface and an external surface. A plurality of perforations are formed through the base between the internal surface and the external surface. A plurality of supports define a plurality of cavities. The plurality of supports extend outwardly from the external surface of the of the base. One or more of the plurality of cavities are in fluid communication with one or more of the plurality of perforations. A backing surface is secured to the plurality of supports. The plurality of supports are disposed between the base and the backing surface. The one or more of the plurality of cavities are in fluid communication with an internal volume defined by the internal surface of the base through the one or more of the plurality of perforations.

In at least one embodiment, the base, the plurality of supports, and the backing surface are integrally formed together as a monolithic, load-bearing structure. For example, the base, the plurality of supports, and the backing surface are additively manufactured together.

In at least one embodiment, each of the plurality of cavities is in fluid communication with at least one of the plurality of perforations. As a further example, the plurality of cavities and the plurality of perforations cooperate to provide a plurality of Helmholtz resonators.

In at least one embodiment, the plurality of cavities are shaped as one or more of triangles, diamonds, circles, or hexagons. In at least one embodiment, the plurality of perforations are shaped as one or more of ellipses, circles, squares, rounded squares, diamonds, rounded diamonds, rectangles, rounded rectangles, parallelograms, or rounded parallelograms.

In at least one embodiment, the plurality of perforations define a flow surface porosity within the base that ranges from 20% to 4%.

As an example, a depth of the plurality of cavities is the same. As another example, a depth of at least two of the plurality of cavities is different.

In at least one embodiment, the flow path duct system includes one or both of an inlet or an outlet nozzle having a high aspect ratio.

Certain embodiments of the subject disclosure provide a method of forming a flow path duct system for a propulsion system of an aircraft. The method includes forming a plurality of perforations through a base defining a flow surface between an internal surface and an external surface; extending a plurality of supports defining a plurality of cavities from the external surface of the of the base; fluidly coupling one or more of the plurality of cavities with one or more of the plurality of perforations, wherein said fluidly coupling comprises fluidly coupling the one or more of the plurality of cavities with an internal volume defined by the internal surface of the base through the one or more of the plurality of perforations; and securing a backing surface to the plurality of supports, wherein said securing comprises disposing the plurality of supports between the base and the backing surface.

Certain embodiments of the subject disclosure provide an aircraft including a propulsion system including a flow path duct system, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

In certain smaller vehicles, such as certain unmanned aerial vehicles (UAVs), or for configurations where a separate liner is not practical, a solution integral to the underlying structure is needed. As a result, there is a need for an integrated propulsion flow path in which acoustic treatments can be incorporated directly into the propulsion flow path structure, in contrast to be being separately secured to the structure.

Certain embodiments of the subject disclosure provide a quiet propulsion flow path duct system that includes a base having a flow surface, a plurality of supports joined together to define a plurality of cavities isolated from each other, and a backing surface. The supports are between the base and the backing surface. The base defines a plurality of perforations. An underlying cavity is in fluid communication with an internal volume of a duct via one or more perforations. In at least one embodiment, the base, supports, and backing surface together form a monolithic, load bearing structure.

In at least one embodiment, instead of separately forming portions, the flow path duct system is integrally formed as a monolithic structure. For example, the flow path duct system is integrally molded and formed as a single, monolithic piece (instead of having separate components formed and secured together). As another example, the flow path duct system, including all component parts, is integrally formed through additive manufacturing.

In at least one embodiment, the plurality of cavities and the perforations together form a plurality of Helmholtz resonators for sound attenuation. In at least one embodiment, the plurality of cavities define a distribution of shapes including triangles, diamonds, circles, hexagons (honeycomb), or a combination thereof. Further, in at least one embodiment, the plurality of cavities can define a distribution of diamond shapes. In some ducts, the perforations can be ellipses, circles, squares, rounded squares, diamonds, rounded diamonds, rectangles, rounded rectangles, parallelograms, rounded parallelograms, or a combination thereof. In at least one embodiment, the perforations can be circles. For some embodiments, the perforations can define a flow surface porosity. The porosity can range from 20% to 4%, for example. In some ducts, the perforations can define a flow surface porosity, the porosity ranging from 10% to 6%, for example.

In at least one embodiment, the depth of the plurality of cavities can define a continuous distribution, a constant distribution, or a step distribution with at least one step. In at least one embodiment, the depth of the plurality of cavities can define a constant distribution or a step distribution with at least one step. In at least one embodiment, the duct can be formed of titanium, titanium alloys, aluminum, aluminum alloys, stainless steel, or polymer. For some ducts, the duct can include a polymer. For some duct embodiments, the duct can be a variable geometry with at least one high aspect ratio inlet or exit.

Figure 1:
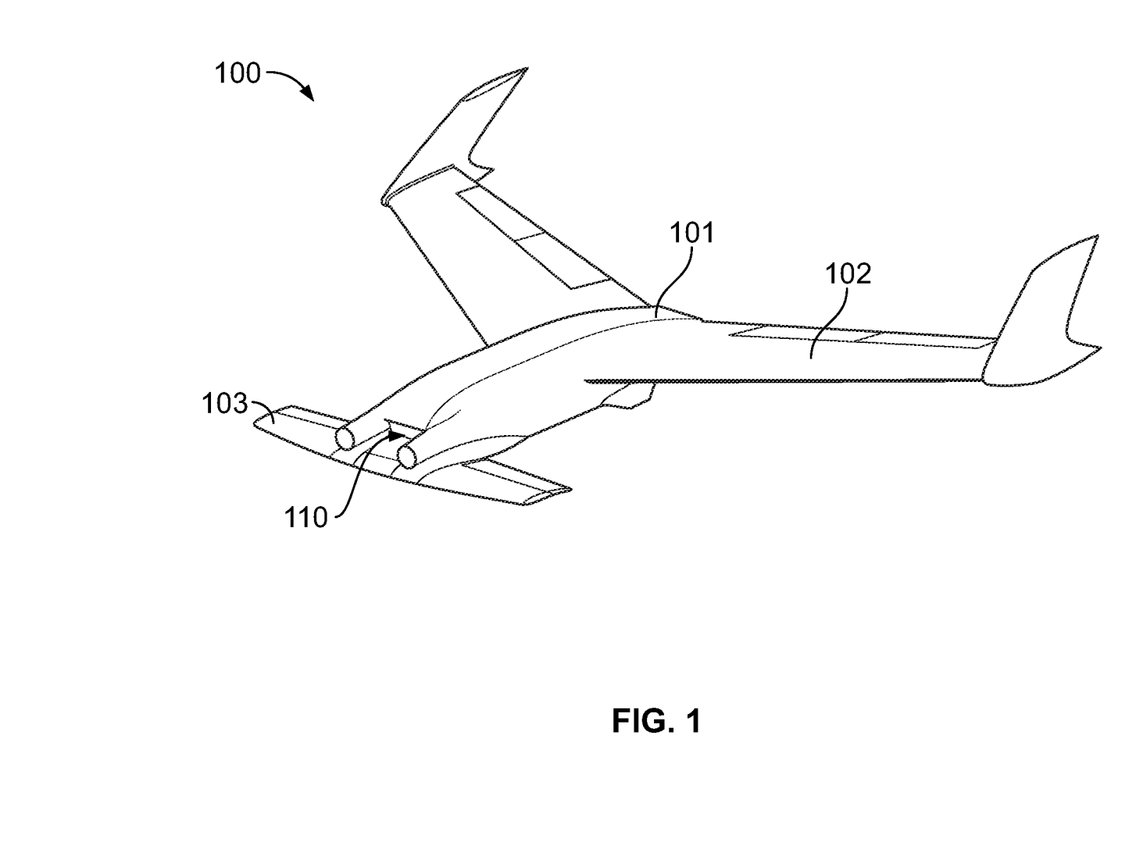
FIG. 1 illustrates a perspective top view of an unmanned aerial vehicle, according to an embodiment of the subject disclosure.

FIG. 1 illustrates a perspective top view of an aircraft 100, such as an unmanned aerial vehicle (UAV), according to an embodiment of the subject disclosure. In at least one embodiment, the UAV 100 includes a main body or fuselage 101, wings 102, and canards 103. The main body 101 defines an inlet 110. The inlet 110 leads into a flow path duct system of a propulsion system. The flow path duct system extends into and through at least a portion of the UAV 100. The flow path duct system is described herein.

Optionally, the UAV 100 can be sized, shaped, and configured differently than shown in FIG. 1. For example, the UAV 100 may not include canards. As another example, the wings 102 can be disposed at locations that are forward from the wings 102 as shown. As another example, the UAV 100 may not include wings. Instead, the UAV 100 can include one or more helicopter-like rotors, for example.

Figure 2:
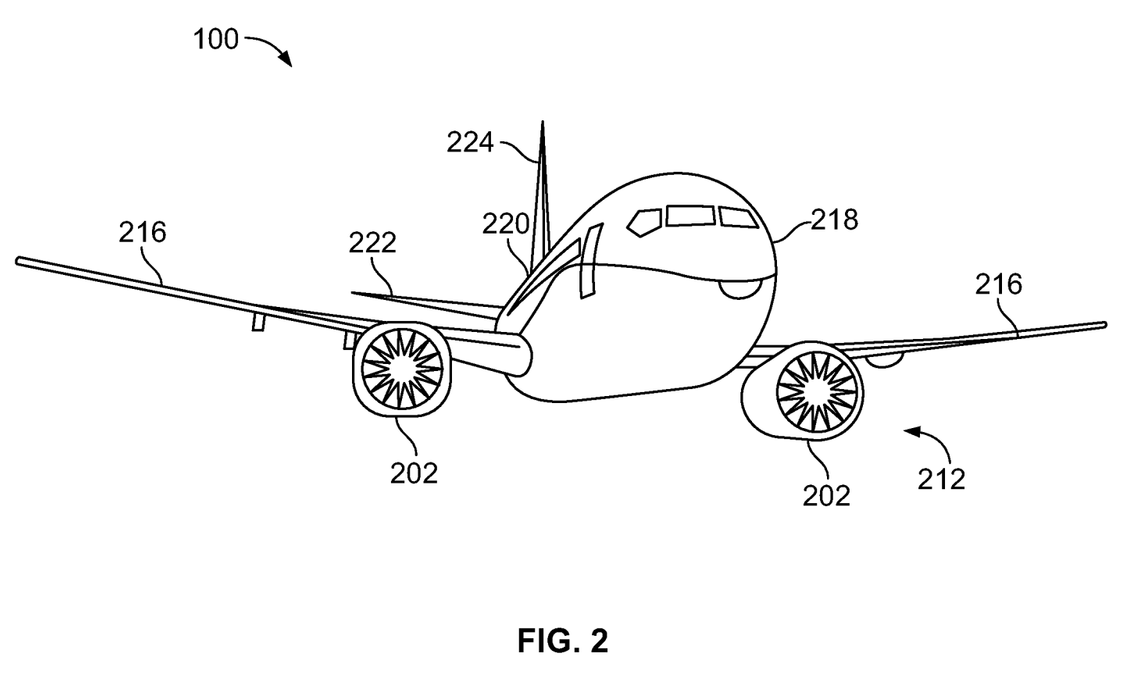
FIG. 2 illustrates a front perspective view of an aircraft, according to an embodiment of the subject disclosure.

FIG. 2 illustrates a front perspective view of an aircraft 100, according to an embodiment of the subject disclosure. The aircraft 100 includes a propulsion system 212 that includes two engines 202, for example, such as two turbofan or turbojet engines. Optionally, the propulsion system 212 may include more engines 202 than shown. The engines 202 are carried by wings 216 of the aircraft 100. In other embodiments, the engines 202 are carried by a fuselage 218 and/or an empennage 220. The empennage 220 may also support horizontal stabilizers 222 and a vertical stabilizer 224. The fuselage 218 of the aircraft 100 defines an internal cabin, including a flight deck. The engines 202 include flow path duct systems, such as described herein.

The aircraft 100 can be sized, shaped, and configured differently than shown in FIG. 2. The aircraft 100 shown in FIG. 1 is merely an example.

Figure 3:
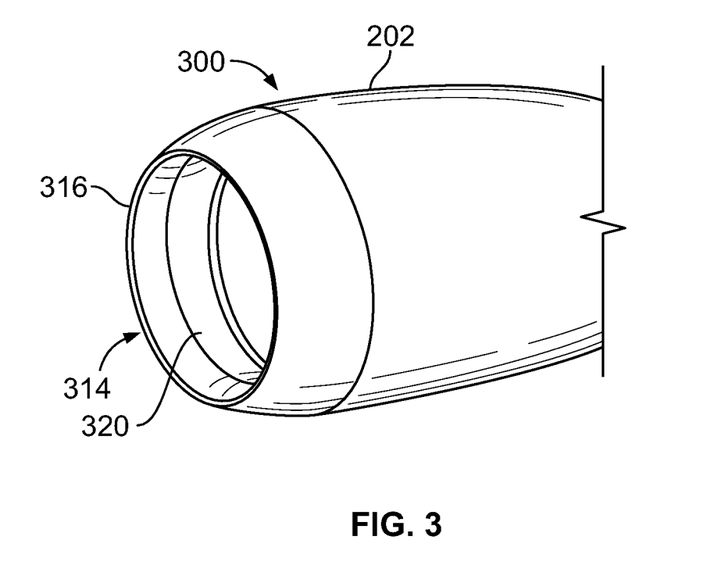
FIG. 3 illustrates a lateral perspective view of an engine, according to an embodiment of the subject disclosure.

FIG. 3 illustrates a lateral perspective view of an engine 202, according to an embodiment of the subject disclosure. In at least one embodiment, the engine 202 is a turbofan or turbojet engine having a case 300 that includes an engine inlet 314, which leads into a flow path duct system, as described herein. The engine inlet 314 may include a leading edge 316 and an inner barrel section 320 located aft of the leading edge 316 of the engine inlet 314. The inner barrel section 320 can provide a boundary surface or wall for directing airflow (not shown) entering the engine inlet 314 and passing through the engine 202. The inner barrel section 320 can be located in relatively close proximity to one or more fan blades (not shown in FIG. 3). In at least one embodiment, the inner barrel section 320 can also be configured to serve as an acoustic structure having a plurality of perforations in an inner face sheet of the inner barrel section 320 for absorbing noise generated by the rotating fan blades and/or noise generated by the airflow entering the engine inlet 314 and passing through the engine 202. In at least one embodiment, the inner barrel section 320 includes, and or can be configured as, a flow path duct system, as described herein.

Figure 4:
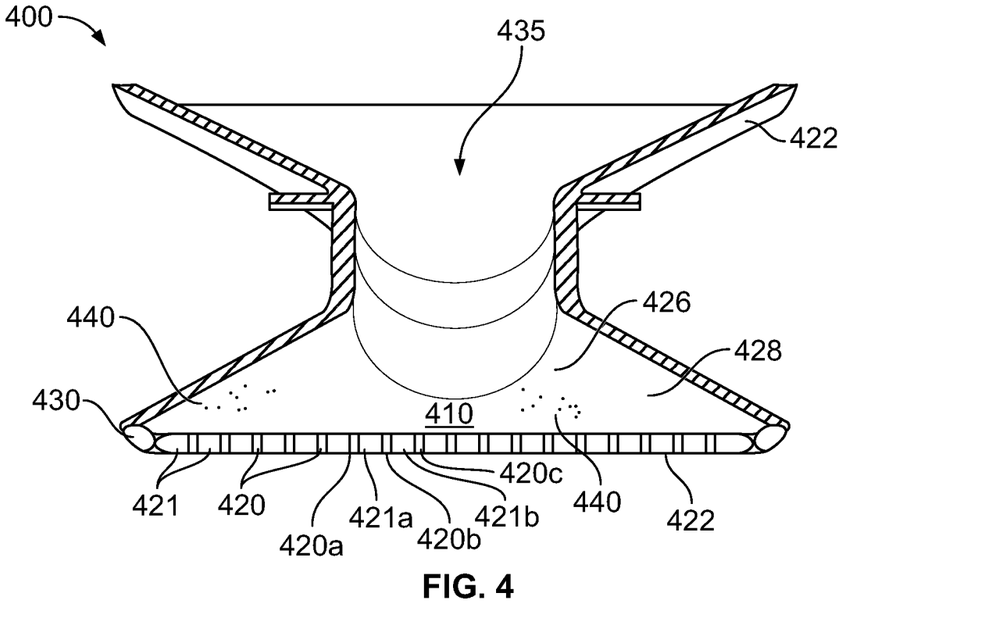
FIG. 4 illustrates a perspective internal view of a flow path duct system, according to an embodiment of the subject disclosure.
Figure 5:
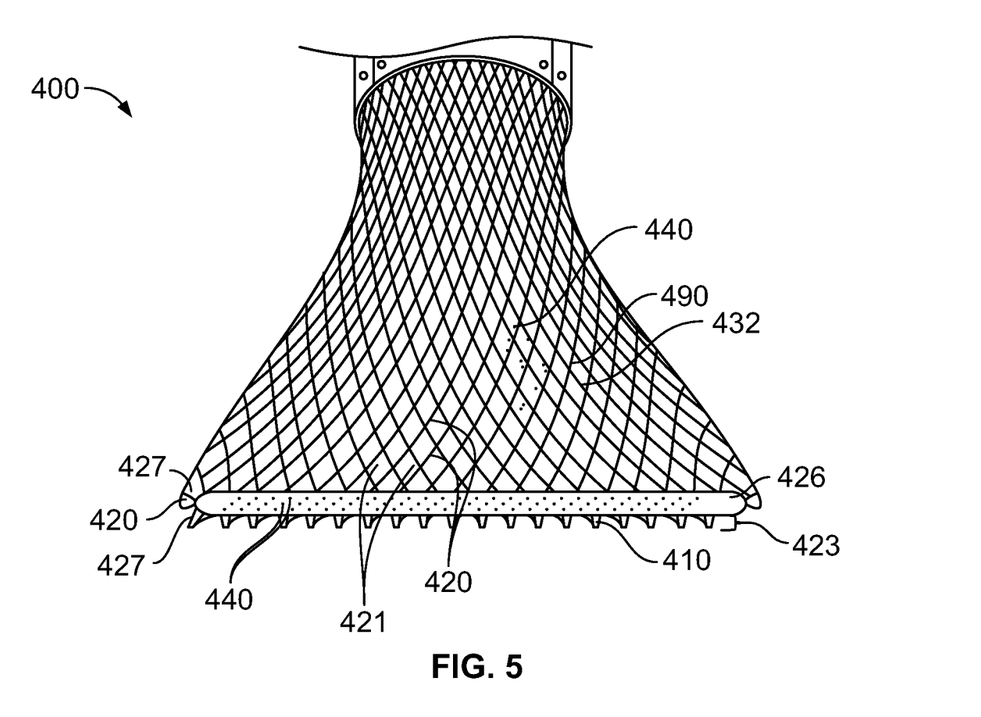
FIG. 5 illustrates a perspective external view of a flow path duct system with a backing surface removed to expose supports and resulting cavities, according to an embodiment of the subject disclosure.

FIG. 4 illustrates a perspective internal view of a flow path duct system 400, according to an embodiment of the subject disclosure. FIG. 5 illustrates a perspective external view of the flow path duct system 400 with a backing surface removed to expose supports and resulting cavities, according to an embodiment of the subject disclosure.

Referring to FIGS. 4 and 5, in at least one embodiment, the flow path duct system 400 is within the UAV 100 shown in FIG. 1. For example, the inlet 110, shown in FIG. 1, leads into, or forms an inlet of, the flow path duct system 400. In at least one other embodiment, the flow path duct system 400 is within the engine 202 shown in FIGS. 2 and 3. For example, the engine inlet 314, shown in FIG. 3, leads into, or forms an inlet of, the flow path duct system 400.

The flow path duct system 400 provides a quiet propulsion flow path system. The flow path duct system 400 includes an internal surface 428, which defines a flow surface 410. For example, a base 426 includes the internal surface 428 that defines the flow surface 410. Fluid, for example, air, travels over and along the flow surface 410. Supports 420 extend opposite from the base 426, such as at edges 422 and an external surface. The supports 420 can include frames, beams, ribs, fins, walls, or the like.

The supports 420 define a plurality of cavities 421. For example, a cavity 421a is defined between a first support 420a and a second support 420b. A cavity 421b is defined between the second support 420b and a third support 420c. The supports 420 can be sized and shaped the same. The supports 420 can be upstanding fins, walls, beams, ribs, and/or or the like.

The flow path duct system 400 also includes a backing surface 430 and a plurality of perforations 440. For example, the backing surface 430 is disposed over external portions of the supports 420, the cavities 421, and/or the perforations 440. The perforations 440 can be formed in the base 426, for example. As an example, the supports 420 extend from the base 426, which provides the flow surface 410. In at least one embodiment, the supports 420 are or otherwise include fins 427 that extend from the base 426. The cavities 421 are defined between the base 426 and the fins 427. The perforations 440 are formed into and/or through the base 426. As such, a fluid flow path extends between the cavities 421, the perforations 440, and the internal volume 435 of the flow path duct system 400. The backing surface 430 can be a sheet, skin, or the like, disposed over the supports 420 and the cavities 421.

The cavities 421 extend from external surfaces of the base 426, opposite from the flow surface 410, thereby extending away from the internal volume 435. The perforations 440 are formed in the base 426 and are in fluid communication with the internal volume 435. As such, the fluid flow path extends from the cavities 421, through the perforations 440 in the base 426, and into the internal volume 435.

In at least one embodiment, the depth 423 of the cavities 421 is constant throughout the flow path duct system 400. That is, the distribution of depths 423 of the cavities 421 can be the same throughout the flow path duct system 400. Optionally, the depths of certain cavities 421 can differ. In at least one embodiment, the flow path duct system 400 shown in FIGS. 4 and 5 provides a monolithic, complex geometry inlet structure that provides sound attenuation.

In at least one embodiment, as shown in FIG. 5, the supports 420 include intersecting, beams, ribs, panels, walls, or fins 427 that intersect to form a plurality of repeating cavities 421. The supports 420 define outer boundaries for the cavities 421, which can have various shapes and sizes.

In at least one embodiment, the flow path duct system 400 is for a propulsion system of an aircraft. The flow path duct system 400 includes the base 426 defining the flow surface 410 (such as on an internal surface 428). The base 426 includes the internal surface 428 and an external surface 432. A plurality of perforations 440 are formed through the base 426 between the internal surface 428 and the external surface 432. The supports 420 define the cavities 421. The supports 420 extend outwardly from the external surface 432 of the of the base 426. One or more of the plurality of cavities 421 are in fluid communication with the one or more of the plurality of perforations 440. The backing surface 430 is secured to the plurality of supports 420. The supports 420 are disposed between the base 426 and the backing surface 430. One or more of the plurality of cavities 421 are in fluid communication with an internal volume 435 defined by the internal surface 428 of the base 426 through one or more of the plurality of perforations 440.

In at least one embodiment, the base 426, the supports 420, and the backing surface 430 are integrally formed together as a monolithic, load-bearing structure. For example, the base 426, the supports 420, and the backing surface 430 are additively manufactured together. That is, the flow path duct system 400, including the components thereof, are integrally formed through an additive manufacturing process.

In at least one embodiment, each of the cavities 421 is in fluid communication with at least one the perforations 440, and/or vice versa. In at least one embodiment, cavities 421 and the perforations 440 cooperate to provide a plurality of Helmholtz resonators.

Figure 6:
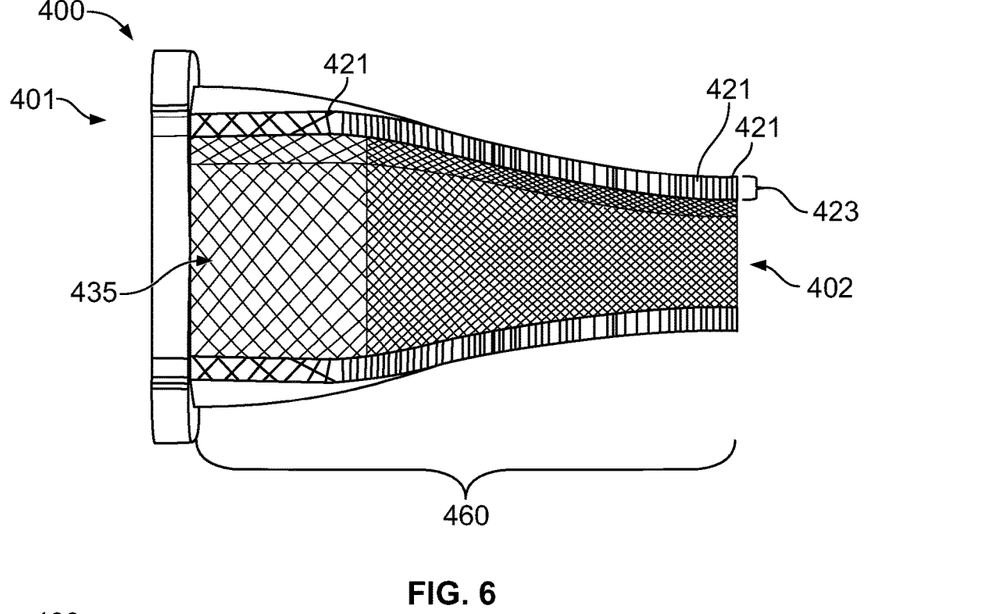
FIG. 6 illustrates a transverse partial cross-sectional view of a flow path duct system having constant depth cavities, according to an embodiment of the subject disclosure.

FIG. 6 illustrates a transverse partial cross-sectional view of the flow path duct system 400 having constant depth cavities, according to an embodiment of the subject disclosure. As shown in FIG. 6, the flow path duct system 400 can be an inlet 401. The depth (or height) 423 of the cavities 421 can be constant along a length 460 of the flow path duct system 400.

Figure 7:
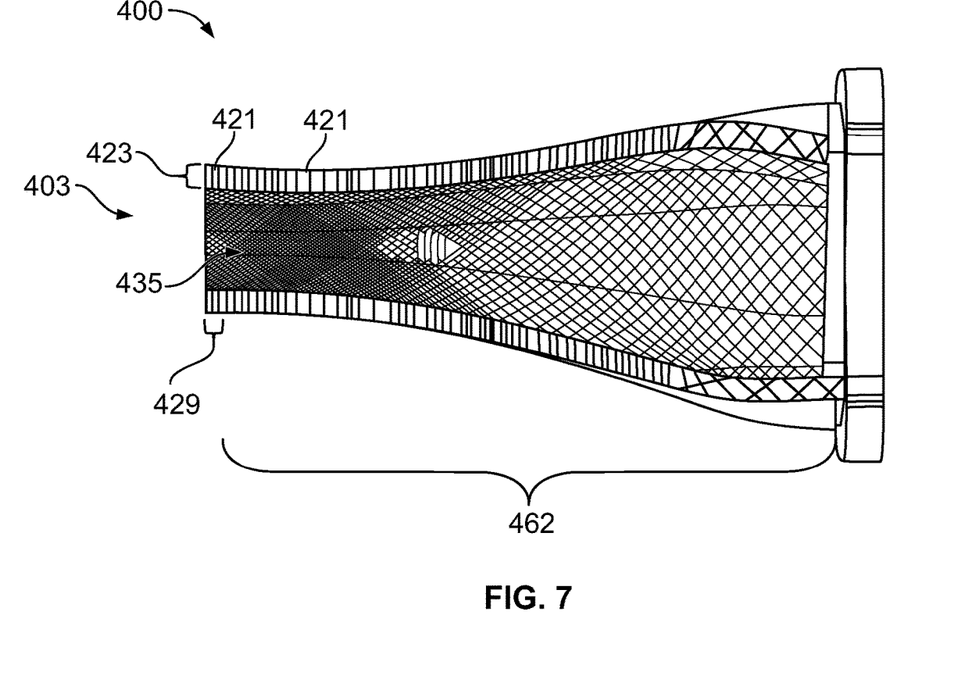
FIG. 7 illustrates a transverse partial cross-sectional view of a flow path duct system having constant depth cavities, according to an embodiment of the subject disclosure.

FIG. 7 illustrates a transverse partial cross-sectional view of the flow path duct system 400 having constant depth cavities 421, according to an embodiment of the subject disclosure. As shown in FIG. 7, the flow path duct system 400 can be an outlet nozzle 403. Again, the depth (or height) 423 of the cavities 421 can be constant along a length 462 of the flow path duct system 400.

Referring to FIGS. 6 and 7, while the depths 423 of the cavities 421 can be the same throughout the flow path duct system 400, the widths 429 can differ. For example, a first set of cavities 421 can have a first width that differs from a second set of cavities 421. Optionally, the width 429 of the cavities 421 can be the same throughout.

Figure 8:
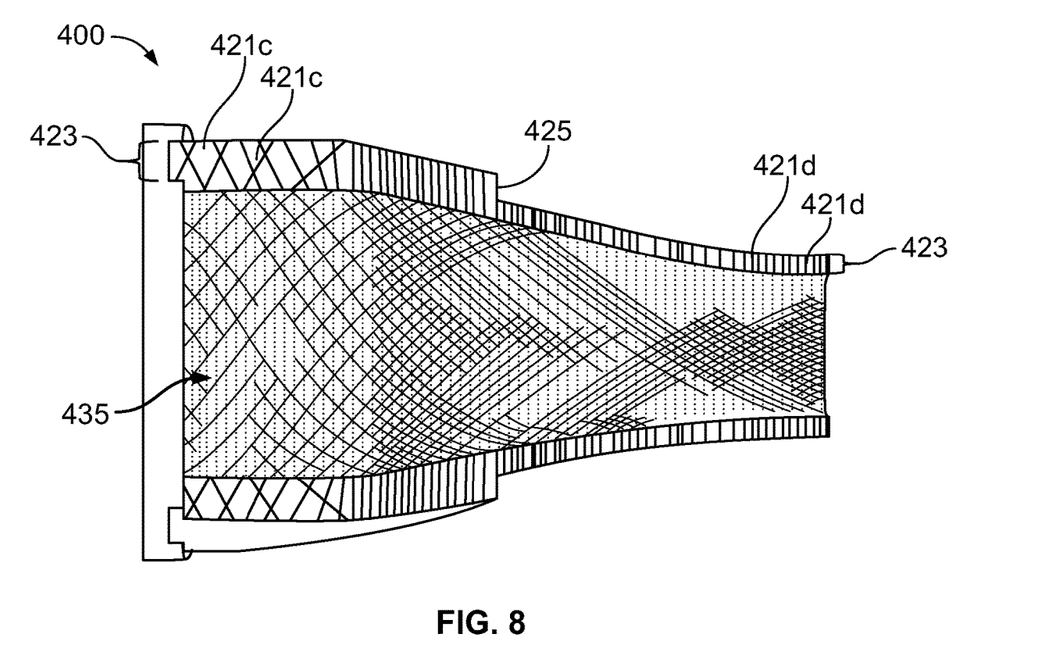
FIG. 8 illustrates transverse partial cross-sectional view of a flow path duct system having cavities with a single step distribution in depth, or two constant depths, according to an embodiment of the subject disclosure.

FIG. 8 illustrates transverse partial cross-sectional view of a flow path duct system 400 having cavities 421c and 421d with a single step distribution in depth 423, or two constant depths, according to an embodiment of the subject disclosure. For example, a first set of cavities 421c has a depth 423 that differs from a depth 423 of a second set of cavities 421d. A step 425 defines a transition between the first set of cavities 421c and the second set of cavities 421d. As shown, the depth 423 of the first set of cavities 421c is greater than the depth 423 of the second set of cavities 421d. Optionally, the depth 423 of the second set of cavities 421d can be greater than the depth 423 of the first set of cavities 421c.

Figure 9:
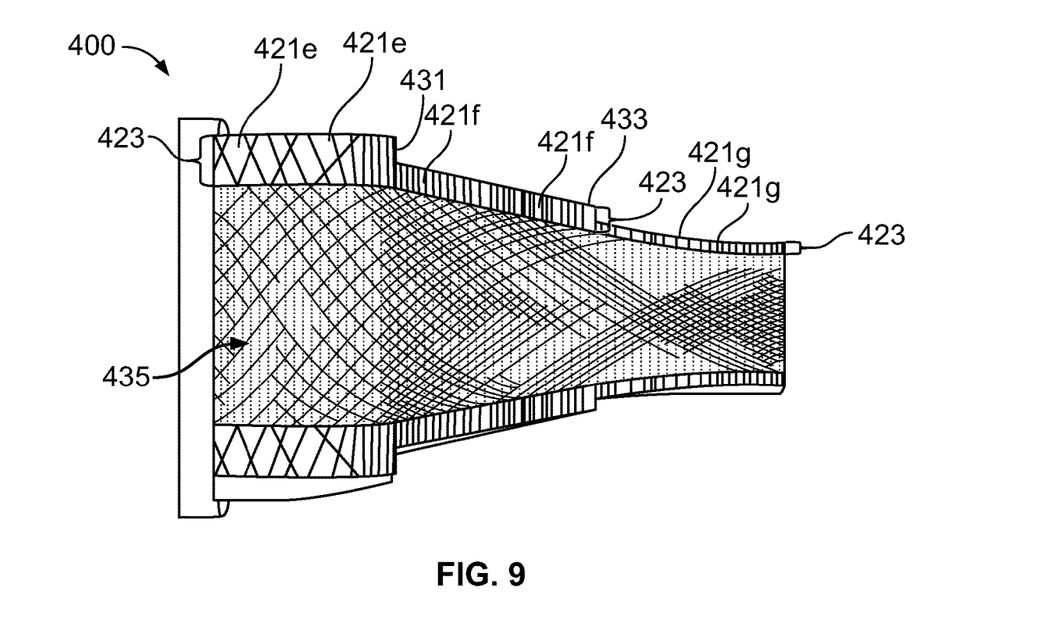
FIG. 9 illustrates a transverse partial cross-sectional view of a flow path duct system having cavities with a double step distribution in depth, or three constant depths, according to an embodiment of the subject disclosure.

FIG. 9 illustrates a transverse partial cross-sectional view of a flow path duct system 400 having cavities 421e, 421f, and 421g with a double step distribution in depth, or three constant depths, according to an embodiment of the subject disclosure. For example, a first set of cavities 421e has a depth 423 that differs from a depth 423 of a second set of cavities 421f, which differs from a depth 423 of a third set of cavities 421g. A step 431 defines a transition between the first set of cavities 421e and the second set of cavities 421f. A step 433 defines a transition between the second set of cavities 421f and the third set of cavities 421g. As shown, the depth 423 of the first set of cavities 421e is greater than the depth 423 of the second set of cavities 421f. Further, the depth 423 of the second set of cavities 421g is greater than the depth 423 of the third set of cavities 421g. Optionally, the depth 423 of the second set of cavities 421f can be greater than the depth 423 of the first set of cavities 421e, and/or the depth 423 of the third set of cavities 421g can be greater than the depth 423 of the second set of cavities 421f.

Referring to FIGS. 4-9, certain embodiments provide a flow path duct system 400, and a method of making the flow path duct system 400. In at least one embodiment, the method includes additively manufacturing a duct geometry as a monolithic structure, in which the geometry includes the flow surface 410, the supports 420 defining the plurality of cavities 421 isolated from each other, and the backing surface 430. In at least one embodiment, the supports 420 are between the flow surface 410 and the backing surface 430.

In at least one embodiment, the flow path duct system 400, and the method of forming the flow patch duct 400, also includes the plurality of perforations 440. The perforations 440 are in fluid communication with one or more cavities 421. In at least one embodiment, the plurality of perforations 440 can be added to the flow surface 410, as opposed to adding them during an additive manufacturing step.

As noted, the supports 420 are between the base 426 and the backing surface 430. In at least one embodiment, the supports 420 can be joined together. For example, the supports 420 can be fastened together. In at least one embodiment, the flow surface 410, the supports 420, and the backing surface 430 define the cavities 421, which are internal to the flow path duct system 400. The cavities 421 are isolated from one another. In at least one embodiment, the base 426, the supports 420, and the backing surface 430 together form a monolithic, load bearing structure. In at least one embodiment, the monolithic structure can be additively manufactured. In at least one embodiment, the flow path duct system 400 can be a primary load bearing structure, thereby resulting in an integrated design with reduced part count and reduced complexity.

The base 426 includes a plurality of perforations 440. One or more cavities 421 are in fluid communication with an internal volume 435 of the flow path duct system 400 through the perforations 440. The perforations 440 provide an acoustic flow path to the underlying isolated cavities 421 to effectively attenuate sound energy. In at least one embodiment, the cavities 421 and the perforations 440 together form a plurality of Helmholtz resonators that are configured to attenuate sound.

The perforations 440 can have a variety of sizes and shapes. For example, the perforations 440 can be formed as ellipses, circles, squares, rounded squares, diamonds, rounded diamonds, rectangles, rounded rectangles, parallelograms, rounded parallelograms, or a combination thereof. A rounded perforation 440 has junctions, edges, and the like that are filleted to provide a smooth transition. In at least one embodiment, the perforations 440 can be circular.

In at least one embodiment, the number of size of the perforations 440 (for example, a surface area and volume of perforation) defines a porosity of the flow surface 410. For example, the porosity (that is, the total volume of open space within the flow path duct system 400), as defined by the perforations 440, ranges from about 20% (for example, between 18%-22%), about 15% (for example, between 13%-17%), about 10% (for example, between 8%-12%), about 8% (for example, between 6%-10%), about 6% (for example, between 4%-8%), or about 5% (for example, between 3%-7%), to about 4% (for example, between 2%-5%), or any combination thereof. In at least one embodiment, the porosity ranges from about 10% to about 6%, or about 8%, for example.

In at least one embodiment, the plurality of cavities 421 define a distribution of shapes including triangles, diamonds, circles, hexagons (honeycomb), or a combination thereof. For example, as shown in FIG. 5, the cavities 421 have shapes 490 in the form of diamonds. In at least one embodiment, the cavities 421 define a distribution of diamond shapes, as shown in FIG. 5, for example. The supports 420 define the outer envelopes of the shapes of the cavities 421. As such, the supports 420 provide load transmission and structural support for the flow path duct systems 400, and define the envelopes of the cavities 421.

In at least one embodiment, the size and spacing of the perforations 440 and the cavities 421 is tuned for tailored frequency attenuation using methods known in the art, for example noise propagation codes (one example being ACoustic TRANsmission (ACTRAN®)), or theoretical methods described in Wu et al., Noise Attenuation Performance of a Helmholtz Resonator Array Consist of Several Periodic Parts, 17 Sensors 2029 (2017). In at least one embodiment, the depth of cavities can be varied for sound attenuation optimization. In some embodiments, the depths 423 of the cavities 421 define a continuous distribution, a constant distribution, a step distribution with at one step for example, one step, two steps, or more).

In at least one embodiment, the material of the flow path duct system 400 can vary depending on actual use and environmental conditions. For example, the flow path duct system 400 is formed of titanium, titanium alloys, aluminum, aluminum alloys, stainless steel, one or more polymers, and/or the like.

In at least one embodiment, the flow path duct system 400 includes a variable geometry. For example, the flow patch duct system 400 includes an inlet flow path, an exit, a nozzle, a partial flow path, and/or a complete flow path. In at least one embodiment, at least one of the inlet (such as the inlet 401 shown in FIG. 6) or the exit (such as the nozzle outlet 403 shown in FIG. 7) includes a high aspect ratio. The aspect ratio is defined as a ratio of width/height of the flow path duct system 400, with an aspect ratio greater than two (that is, the width being at least twice the height) being a high aspect ratio for a flow path duct system 400. In at least one embodiment, both the inlet 401 and nozzle outlet 402 have high aspect ratios.

While the fluid path duct systems 400 described herein can be monolithic in terms of the construction of the acoustic treatment and the load bearing structure, the complete assembled flow path duct systems 400 as integrated into a vehicle (such as an aircraft) can include several different monolithic duct geometry sections (for example, inlet, nozzle, upper half, lower half) as opposed to one large section due to additive manufacturing and installation constraints.

In at least one embodiment, instead of additively manufacturing the flow surface 410 with a plurality of perforations 440, different methods can be used to form the perforations 440. For example, the perforations 440 can be formed through drilling cutting, laser cutting, vaporization, ablation, chemical treatment, and/or the like.

As described herein, certain embodiments of the subject disclosure provide a quiet propulsion flow path duct system 400, which includes the flow surface 410, a plurality of supports 420 defining a plurality of cavities 421 isolated from each other, and a backing surface 430. The supports 420 are between the flow surface 410 and the backing surface 430. For example, the supports 420 are sandwiched between the flow surface 410 and the backing surface 430. The base 426 having the flow surface 410 includes a plurality of perforations 440, such that at least one underlying cavity 421 is in fluid communication with the internal volume 435 through the perforations 440. In at least one embodiment, the flow surface 410, the supports 420, and the backing surface 430 together form a monolithic, load bearing structure.

Figure 10:
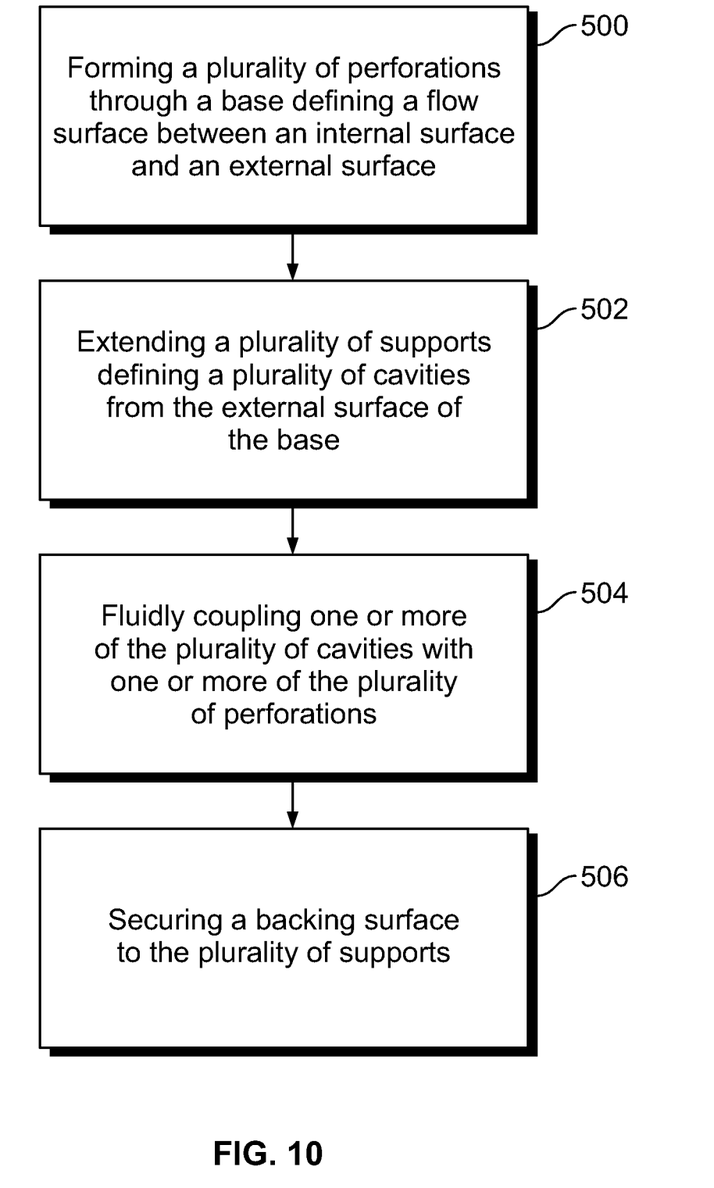
FIG. 10 illustrates a flow chart of a method of forming a flow path duct system for a propulsion system of an aircraft, according to an embodiment of the subject disclosure.

FIG. 10 illustrates a flow chart of a method of forming a flow path duct system for a propulsion system of an aircraft, according to an embodiment of the subject disclosure. Referring to FIGS. 1-10, the method includes forming, at 500, a plurality of perforations 440 through a base 426 defining a flow surface 410 between an internal surface 428 and an external surface 432; extending, at 502, a plurality of supports 420 defining a plurality of cavities 421 from the external surface 432 of the of the base 426; fluidly coupling, at 504, one or more of the plurality of cavities 421 with one or more of the plurality of perforations 440, wherein said fluidly coupling 504 includes fluidly coupling the one or more of the plurality of cavities 421 with an internal volume 435 defined by the internal surface 428 of the base 426 through the one or more of the plurality of perforations 440; and securing, at 506, a backing surface 430 to the plurality of supports 420, wherein said securing 506 includes disposing the plurality of supports 420 between the base 426 and the backing surface 430.

In at least one embodiment, the method further includes integrally forming the base 426, the plurality of supports 420, and the backing surface 430 together as a monolithic, load-bearing structure. As a further example, said integrally forming includes additively manufacturing the base 426, the plurality of supports 420, and the backing surface 430 together.

In at least one embodiment, said fluidly coupling 504 includes fluidly coupling each of the plurality of cavities 421 with at least one of the plurality of perforations 440.

In at least one embodiment, said forming 500 includes forming the plurality of perforations 440 to define a flow surface porosity within the base that ranges from 20% to 4%.

In at least one embodiment, the method includes forming the flow path duct system 400 as one or both of an inlet or an outlet nozzle having a high aspect ratio.

It has been discovered that the embodiments of the flow path duct systems 400 described herein reduce acoustic noise, as well as being able to serve as a primary, load-bearing structure.

Further, the disclosure comprises embodiments according to the following clauses:

Clause 1. A flow path duct system for a propulsion system of an aircraft, the flow path duct system comprising:
a base defining a flow surface, wherein the base has an internal surface and an external surface, wherein a plurality of perforations are formed through the base between the internal surface and the external surface;
a plurality of supports defining a plurality of cavities, wherein the plurality of supports extend outwardly from the external surface of the of the base, and wherein one or more of the plurality of cavities are in fluid communication with one or more of the plurality of perforations; and
a backing surface secured to the plurality of supports,
wherein the plurality of supports are disposed between the base and the backing surface, and
wherein the one or more of the plurality of cavities are in fluid communication with an internal volume defined by the internal surface of the base through the one or more of the plurality of perforations.

Clause 2. The flow path duct system of Clause 1, wherein the base, the plurality of supports, and the backing surface are integrally formed together as a monolithic, load-bearing structure.

Clause 3. The flow path duct system of Clause 2, wherein the base, the plurality of supports, and the backing surface are additively manufactured together.

Clause 4. The flow path duct system of any of Clauses 1-3, wherein each of the plurality of cavities is in fluid communication with at least one of the plurality of perforations.

Clause 5. The flow path duct system of Clause 4, wherein the plurality of cavities and the plurality of perforations cooperate to provide a plurality of Helmholtz resonators.

Clause 6. The flow path duct system of any of Clauses 1-5, wherein the plurality of cavities are shaped as one or more of triangles, diamonds, circles, or hexagons.

Clause 7. The flow path duct system of any of Clauses 1-6, wherein the plurality of perforations are rounded.

Clause 8. The flow path duct system of any of Clauses 1-7, wherein the plurality of perforations define a flow surface porosity within the base that ranges from 20% to 4%.

Clause 9. The flow path duct system of any of Clauses 1-8, wherein a depth of the plurality of cavities is the same.

Clause 10. The flow path duct system of any of Clauses 1-9, wherein a depth of at least two of the plurality of cavities is different.

Clause 11. The flow path duct system of any of Clauses 1-10, further comprising one or both of an inlet or an outlet nozzle having a high aspect ratio.

Clause 12. A method of forming a flow path duct system for a propulsion system of an aircraft, the method comprising:
forming a plurality of perforations through a base defining a flow surface between an internal surface and an external surface;
extending a plurality of supports defining a plurality of cavities from the external surface of the of the base;
fluidly coupling one or more of the plurality of cavities with one or more of the plurality of perforations, wherein said fluidly coupling comprises fluidly coupling the one or more of the plurality of cavities with an internal volume defined by the internal surface of the base through the one or more of the plurality of perforations; and
securing a backing surface to the plurality of supports, wherein said securing comprises disposing the plurality of supports between the base and the backing surface.

Clause 13. The method of Clause 12, further comprising integrally forming the base, the plurality of supports, and the backing surface together as a monolithic, load-bearing structure.

Clause 14. The method of Clauses 12 or 13, wherein said integrally forming comprises additively manufacturing the base, the plurality of supports, and the backing surface together.

Clause 15. The method of any of Clauses 12-14, wherein said fluidly coupling comprises fluidly coupling each of the plurality of cavities with at least one of the plurality of perforations.

Clause 16. The method of any of Clauses 12-15, wherein said forming comprises forming the plurality of perforations to define a flow surface porosity within the base that ranges from 20% to 4%.

Clause 17. The method of any of Clauses 12-16, further comprising forming the flow path duct system as one or both of an inlet or an outlet nozzle having a high aspect ratio.

Clause 18. An aircraft comprising:
a propulsion system including a flow path duct system, the flow path duct system comprising:
  a base defining a flow surface, wherein the base has an internal surface and an external surface, wherein a plurality of perforations are formed through the base between the internal surface and the external surface;
  a plurality of supports defining a plurality of cavities, wherein the plurality of supports extend outwardly from the external surface of the of the base, and wherein each of the plurality of cavities is in fluid communication with at least one of the plurality of perforations; and
  a backing surface secured to the plurality of supports, wherein the plurality of supports are disposed between the base and the backing surface, and
  wherein the plurality of cavities are in fluid communication with an internal volume defined by the internal surface of the base through the plurality of perforations.

Clause 19. The aircraft of Clause 18, wherein the base, the plurality of supports, and the backing surface are additively manufactured together as a monolithic, load-bearing structure.

Clause 20. The aircraft of Clauses 18 or 19, wherein the plurality of perforations define a flow surface porosity within the base that ranges from 20% to 4%.

As described herein, embodiments of the present disclosure provide systems and methods for efficiently and effectively reducing noise in relation to various components, such as an engine of aircraft. Further, embodiments of the present disclosure provide relatively simple systems and methods for reducing noise with respect to aircraft, for example.

While various spatial and directional terms, such as top, bottom, lower, mid, lateral, horizontal, vertical, front and the like can be used to describe embodiments of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "containing" are used as the plain-English equivalents of the term "comprising" and the term "in which" is used as the plain-English equivalents of the term "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A flow path duct system for a propulsion system of an aircraft, the flow path duct system comprising:
  an inlet nozzle defining a single fluid flow path having a first high aspect ratio;
  an outlet nozzle having a second high aspect ratio;
  a base defining a flow surface, wherein the base has an internal surface and an external surface, wherein a plurality of perforations are formed through the base between the internal surface and the external surface;
  a plurality of supports defining a plurality of cavities, wherein the plurality of supports extend outwardly from the external surface of the base, and wherein one or more of the plurality of cavities are in fluid communication with one or more of the plurality of perforations; and
  a backing surface secured to the plurality of supports, wherein the plurality of supports are disposed between the base and the backing surface, and
  wherein the one or more of the plurality of cavities are in fluid communication with an internal volume defined by the internal surface of the base through the one or more of the plurality of perforations.

2. The flow path duct system of claim 1, wherein the base, the plurality of supports, and the backing surface are integrally formed together as a monolithic, load-bearing structure.

3. The flow path duct system of claim 2, wherein the base, the plurality of supports, and the backing surface are additively manufactured together.

4. The flow path duct system of claim 1, wherein each of the plurality of cavities is in fluid communication with at least one of the plurality of perforations.

5. The flow path duct system of claim 4, wherein the plurality of cavities and the plurality of perforations cooperate to provide a plurality of Helmholtz resonators.

6. The flow path duct system of claim 1, wherein the plurality of cavities are shaped as one or more of triangles, diamonds, circles, or hexagons.

7. The flow path duct system of claim 1, wherein the plurality of perforations are rounded.

8. The flow path duct system of claim 1, wherein the plurality of perforations define a flow surface porosity within the base that ranges from 20% to 4%.

9. The flow path duct system of claim 1, wherein a depth of the plurality of cavities is the same.

10. The flow path duct system of claim 1, wherein a depth of at least two of the plurality of cavities is different.

11. The flow path duct system of claim 1, wherein the plurality of cavities are shaped as diamonds.

12. The flow path duct system of claim 1, wherein the one or more of the plurality of cavities comprises a first set of cavities and a second cavities, wherein a single step distribution in depth is defined between the first set of cavities and the second set of cavities.

13. The flow path duct system of claim 1, wherein the inlet nozzle, the outlet nozzle, the base, the plurality of support, and the backing surface are integrally molded and formed as a monolithic structure.

14. A method of forming a flow path duct system for a propulsion system of an aircraft, the method comprising:
   forming the flow path duct system between an inlet nozzle and an outlet nozzle, wherein the inlet nozzle defines a single fluid flow path, and wherein each of the single fluid flow path of the inlet nozzle and the outlet nozzle has a high aspect ratio;
   forming a plurality of perforations through a base defining a flow surface between an internal surface and an external surface;
   extending a plurality of supports defining a plurality of cavities from the external surface of the base;
   fluidly coupling one or more of the plurality of cavities with one or more of the plurality of perforations, wherein said fluidly coupling comprises fluidly coupling the one or more of the plurality of cavities with an internal volume defined by the internal surface of the base through the one or more of the plurality of perforations; and
   securing a backing surface to the plurality of supports, wherein said securing comprises disposing the plurality of supports between the base and the backing surface.

15. The method of claim 14, further comprising integrally forming the base, the plurality of supports, and the backing surface together as a monolithic, load-bearing structure.

16. The method of claim 14, wherein said integrally forming comprises additively manufacturing the base, the plurality of supports, and the backing surface together.

17. The method of claim 14, wherein said fluidly coupling comprises fluidly coupling each of the plurality of cavities with at least one of the plurality of perforations.

18. The method of claim 14, wherein said forming comprises forming the plurality of perforations to define a flow surface porosity within the base that ranges from 20% to 4%.

19. An aircraft comprising:
   a propulsion system including a flow path duct system extending between an inlet nozzle and an outlet nozzle, wherein the inlet nozzle defines a single fluid flow path, wherein each of the single fluid flow path of the inlet nozzle and the outlet nozzle has a high aspect ratio, the flow path duct system comprising:
     a base defining a flow surface, wherein the base has an internal surface and an external surface, wherein a plurality of perforations are formed through the base between the internal surface and the external surface;
     a plurality of supports defining a plurality of cavities, wherein the plurality of supports extend outwardly from the external surface of the base, and wherein each of the plurality of cavities is in fluid communication with at least one of the plurality of perforations; and
     a backing surface secured to the plurality of supports, wherein the plurality of supports are disposed between the base and the backing surface, and
     wherein the plurality of cavities are in fluid communication with an internal volume defined by the internal surface of the base through the plurality of perforations.

20. The aircraft of claim 19, wherein the base, the plurality of supports, and the backing surface are additively manufactured together as a monolithic, load-bearing structure.

21. The aircraft of claim 19, wherein the plurality of perforations define a flow surface porosity within the base that ranges from 20% to 4%.

* * * * *